(12) United States Patent
Bulekbay et al.

(10) Patent No.: US 10,508,517 B2
(45) Date of Patent: Dec. 17, 2019

(54) REMOVING SCALE FROM A WELLBORE

(71) Applicant: Saudi Arabian Oil Company, Dhahran (SA)

(72) Inventors: Aslan Bulekbay, Udhailiyah (SA); Sultan Attiah, Udhailiyah (SA); Talal Al-Mutairi, Udhailiyah (SA); Abdulrahman Alsousy, Riyadh (SA)

(73) Assignee: Saudi Arabian Oil Company, Dhahran (SA)

( * ) Notice: Subject to any disclaimer, the term of this patent is extended or adjusted under 35 U.S.C. 154(b) by 0 days.

(21) Appl. No.: 15/914,180

(22) Filed: Mar. 7, 2018

(65) Prior Publication Data

US 2019/0277111 A1 Sep. 12, 2019

(51) Int. Cl.
| | |
|---|---|
| *E21B 37/06* | (2006.01) |
| *E21B 33/068* | (2006.01) |
| *C09K 8/536* | (2006.01) |
| *C09K 8/528* | (2006.01) |
| *E21B 41/00* | (2006.01) |

(52) U.S. Cl.
CPC ............. *E21B 37/06* (2013.01); *C09K 8/528* (2013.01); *C09K 8/536* (2013.01); *E21B 33/068* (2013.01); *E21B 41/0078* (2013.01)

(58) Field of Classification Search
None
See application file for complete search history.

(56) References Cited

U.S. PATENT DOCUMENTS

| | | | | |
|---|---|---|---|---|
| 3,882,937 | A | * | 5/1975 | Robinson .............. E21B 36/003 165/45 |
| 4,476,932 | A | | 10/1984 | Emery |
| 4,532,992 | A | | 8/1985 | Coenen et al. |
| 4,660,643 | A | | 4/1987 | Perkins |
| 4,705,113 | A | | 11/1987 | Perkins |
| 5,394,942 | A | * | 3/1995 | Catania ................. E21B 36/001 166/302 |
| 6,347,675 | B1 | | 2/2002 | Kolle |
| 6,988,552 | B2 | | 1/2006 | Wilson et al. |
| 7,516,787 | B2 | | 4/2009 | Kaminsky |
| 7,647,971 | B2 | | 1/2010 | Kaminsky |
| 7,677,317 | B2 | * | 3/2010 | Wilson .................... E21B 37/06 166/279 |

(Continued)

FOREIGN PATENT DOCUMENTS

| | | |
|---|---|---|
| AU | 2013206729 | 4/2015 |
| CN | 102777138 | 1/2016 |

(Continued)

OTHER PUBLICATIONS

Schlumberger Oilfield Glossary, "underbalance" retrieved Apr. 12, 2019 from https://www.glossary.oilfield.slb.com/Terms/u/underbalance.aspx (Year: 2019).*

(Continued)

*Primary Examiner* — Angela M DiTrani Leff
(74) *Attorney, Agent, or Firm* — Fish & Richardson P.C.

(57) ABSTRACT

Supercritical carbon dioxide is directed into a wellbore to a specified depth. The supercritical carbon dioxide is directed at an inner surface of the wellbore at the specified depth. Scale is removed from the wall of the wellbore with the supercritical carbon dioxide.

8 Claims, 2 Drawing Sheets

(56) References Cited

U.S. PATENT DOCUMENTS

| | | | |
|---|---|---|---|
| 8,002,038 B2 | 8/2011 | Wilson | |
| 8,104,537 B2 | 1/2012 | Kaminsky | |
| 9,097,094 B1 | 8/2015 | Frost | |
| 9,328,282 B2 | 5/2016 | Li | |
| 10,012,054 B2 | 7/2018 | Ciglenec | |
| 2005/0097911 A1 | 5/2005 | Revellat | |
| 2005/0126784 A1* | 6/2005 | Dalton | C09K 8/524 166/304 |
| 2006/0144619 A1 | 7/2006 | Storm | |
| 2007/0215355 A1* | 9/2007 | Shapovalov | C09K 8/52 166/305.1 |
| 2008/0223579 A1 | 9/2008 | Goodwin | |
| 2013/0312977 A1* | 11/2013 | Lembcke | E21B 37/04 166/311 |
| 2015/0047846 A1 | 2/2015 | Oort | |
| 2018/0230361 A1 | 8/2018 | Foster | |
| 2018/0328156 A1* | 11/2018 | Slater | E21B 43/2408 |
| 2019/0055818 A1 | 2/2019 | Bulekbay | |

FOREIGN PATENT DOCUMENTS

| | | |
|---|---|---|
| WO | 2009018536 | 2/2009 |
| WO | 2017164878 | 9/2017 |

OTHER PUBLICATIONS

Gil et al., "Wellbore Cooling as a Means to Permanently Increase Fracture Gradient," SPE Annual Technical Conference and Exhibition, San Antonio, Texas, Sep. 24-27, 2006, published Jan. 1, 2006, 9 pages.

International Search Report and Written Opinion issued in International Application No. PCT/US2018/000170 dated Jan. 28, 2019, 14 pages.

'hub.globalccsinstitute.com' [online], "2.1 The Properties of CO2," available on or before Oct. 22, 2015, via Internet Archive: Wayback Machine URL <https://hub.globalccsinstitute.com/publications/hazard-analysis-offshore-carbon-capture-platforms-and-offshore-pipelines/21-properties-co2>, 12 pages.

'princeton.edu' [online], "Bernoulli's Equation," available on or before Jul. 24, 1997, via Internet Archive: Wayback Machine URL <https://www.princeton.edu/~asmits/Bicycle_web/Bernoulli.html>, 5 pages.

Clifton, "Modeling of In-Situ Stress Change Due to Cold Fluid Injection," SPE papers 22107, presented at the International Arctic Technology Conference, May 29-31, 1991, 13 pages.

Jensen, "Thermally induced hydraulic fracturing of cold water injectors," WPC-26154, 14th World Petroleum Congress, May 29-Jun. 1, 1994, 2 pages.

Masa and Kuba, "Efficient use of compressed air for dry ice blasting," Journal of Cleaner Production, vol. 111, Part A, Jan. 2016, 9 pages.

Mueller et al., "Stimulation of Tight Gas Reservoir using coupled Hydraulic and CO2 Cold-frac Technology," SPE 160365, presented at the SPE Asia Pacific Oil and Gas Conference and Exhibition, Oct. 22-24, 2012, 7 pages.

Praxair, "Carbon Dioxide, Solid or Dry Ice, Safety Data Sheet P-4575," Praxair, Jan. 1, 1997, 7 pages.

Soreide et al., "Estimation of reservoir stress effects due to injection of cold fluids: an example from NCS," ARMA 14-7394, presented at the 48th US Rock mechanics/Geomechanics Symposium, Jun. 1-4, 2014, 7 pages.

International Search Report and Written Opinion issued in International Application No. PCT/US2019/020904 dated May 27, 2019, 14 pages.

* cited by examiner

REMOVING SCALE FROM A WELLBORE

TECHNICAL FIELD

This disclosure relates to cleaning wellbores.

BACKGROUND

As wells produce hydrocarbons, they can begin to experience skin effects. Skin effects reduce the production rate of the well. Skin effects can include a wide range of phenomenon. For example, scale can form within the wellbore and reduce a hydrocarbon flow rate out of a reservoir. Scale is a common part of hydrocarbon and water producing wells that can be categorized into three types: water-soluble, acid-soluble, and non-soluble.

SUMMARY

This disclosure describes technologies relating to reducing skin effects within wellbores.

An example implementation of the subject matter described within this disclosure is a first method with the following features. Supercritical carbon dioxide is directed into a wellbore to a specified depth. The supercritical carbon dioxide is directed at an inner surface of the wellbore at the specified depth. Scale is removed from the wall of the wellbore with the supercritical carbon dioxide.

Aspects of the example first method, which can be combines with the example first method alone or in combination, include the following. Directing the supercritical carbon dioxide onto the wall of the wellbore includes directing through a nozzle.

Aspects of the example first method, which can be combines with the example first method alone or in combination, include the following. The nozzle is an isentropic nozzle.

Aspects of the example first method, which can be combines with the example first method alone or in combination, include the following. A phase of the supercritical carbon dioxide is changed to solid, liquid, or gas phase of carbon dioxide.

Aspects of the example first method, which can be combines with the example first method alone or in combination, include the following. The removed scale is extracted from the wellbore.

Aspects of the example first method, which can be combines with the example first method alone or in combination, include the following. The scale is an acid-soluble scale.

Aspects of the example first method, which can be combines with the example first method alone or in combination, include the following. The wellbore is swept with a gel after extracting the removed scale.

Aspects of the example first method, which can be combines with the example first method alone or in combination, include the following. Reservoir fluid is flowed through the wellbore in an underbalanced condition.

An example implementation of the subject matter described within this disclosure is a second method of reducing skin-effects performed by supercritical carbon dioxide in a wellbore. The method has the following features. Supercritical carbon dioxide travels through a workstring positioned in a wellbore to a specified depth within the wellbore. Supercritical carbon dioxide impacts a wall of the wellbore at the specified depth. Supercritical carbon dioxide reduces skin-effects on the wellbore in response to impacting the supercritical carbon dioxide.

Aspects of the example second method, which can be combines with the example second method alone or in combination, include the following. The skin effects include scale. The scale is removed.

Aspects of the example second method, which can be combines with the example second method alone or in combination, include the following. The scale is a non-soluble scale.

Aspects of the example second method, which can be combines with the example second method alone or in combination, include the following. The removed scale is lifted to a topside facility.

Aspects of the example second method, which can be combines with the example second method alone or in combination, include the following. The supercritical carbon dioxide changes phase to a solid phase, a liquid phase, and a gas phase of carbon dioxide.

Aspects of the example second method, which can be combines with the example second method alone or in combination, include the following. Reservoir fluid is flowed through the wellbore in an underbalanced condition.

An example implementation of the subject matter described within this disclosure is a third method with the following features. Supercritical carbon dioxide is pumped into a wellbore to a target depth. The supercritical carbon dioxide is sprayed onto a wall of the wellbore at the target depth within the wellbore. Scale is removed from the wall of the wellbore with the carbon dioxide. The wellbore is swept with a gel after removing the scale.

Aspects of the example third method, which can be combines with the example third method alone or in combination, include the following. The supercritical carbon dioxide is sprayed through an isentropic nozzle.

Aspects of the example second method, which can be combines with the example second method alone or in combination, include the following. A phase of the supercritical carbon dioxide is changed to solid, liquid, and gas phase of carbon dioxide.

Aspects of the example second method, which can be combines with the example second method alone or in combination, include the following. The scale is a non-soluble scale.

Aspects of the example second method, which can be combines with the example second method alone or in combination, include the following. Reservoir fluid is flowed through the wellbore in an underbalanced condition.

Aspects of the example second method, which can be combines with the example second method alone or in combination, include the following. Spraying the supercritical carbon dioxide includes flowing the supercritical carbon dioxide through an isentropic nozzle.

Particular implementations of the subject matter described in this disclosure can be implemented so as to realize one or more of the following advantages. Descaling operations are performed in an underbalanced condition to prevent formation damage. There is significant cost and time savings using the described methods in this disclosure. Aspects of this disclosure are applicable to removing non-soluble scale.

The details of one or more implementations of the subject matter described in this disclosure are set forth in the accompanying drawings and the description. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Scale is a common part of hydrocarbon and water producing wells that can be categorized into three types: water-soluble, acid-soluble, and most difficult to remove is the non-soluble scale that are usually removed using milling, chemicals, and gelling agents with coiled tubing that is equipped with a special motor and drill bit. Successfully completing de-scaling operations for depleted reservoirs can be difficult. For example, either a production interval needs to be successfully isolated before de-scaling is done for tubulars uphole of the production interval, or de-scaling operations need to be done under underbalanced conditions where fluid hydrostatic is less than the reservoir pressure of a particular reservoir.

This disclosure relates to a method to de-scale a well using supercritical carbon dioxide pumped through a downhole jetting tool. Supercritical carbon dioxide is carbon dioxide at a temperature above the critical temperature of carbon dioxide and at a pressure above the critical pressure of carbon dioxide, for example, above 31.1° C. and above 73 atmospheres of pressure. A nozzle of the jetting tool is configured to allow the supercritical carbon dioxide to impact the wellbore wall as a mixture of multiple phases (solid particles, liquid stream, supercritical phase, and a gaseous phase). The solid particles act as an abrasive while the liquid phase washes away any particles removed by the abrasion. In some implementations, the phase change from solid and liquid to gas at least partially aids in lifting any removed particles. The combination of phases is sufficient to effectively remove non-soluble scale. The operation is performed in an underbalanced condition to prevent or otherwise reduce formation damage. The expansion of the carbon dioxide at least partially aids the scale particles to be lifted through the annulus.

Figure 1:
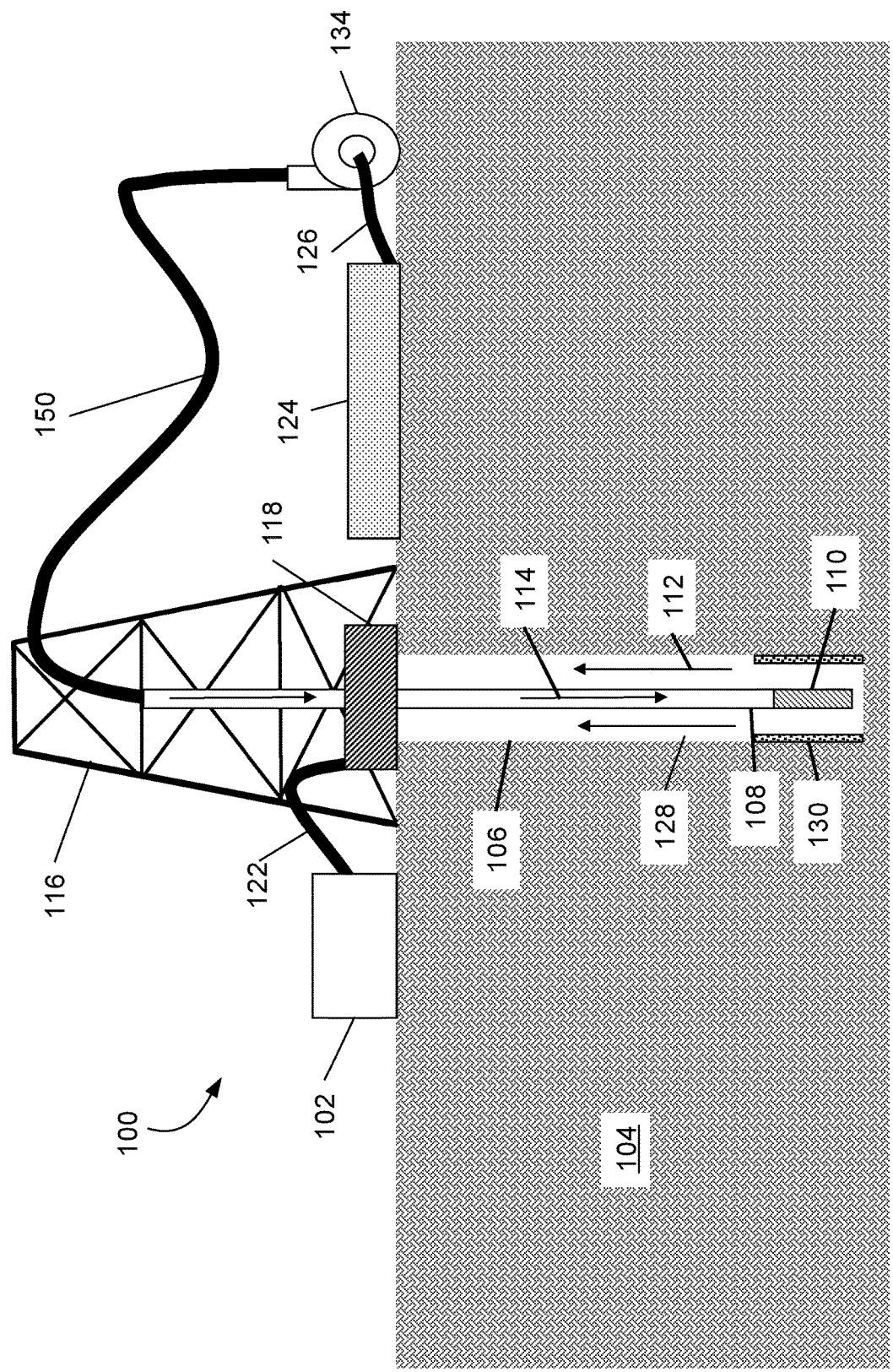
FIG. 1 is a side cross-sectional view of an example wellbore cleaning system.

FIG. 1 shows a side cross-sectional view of an example wellbore cleaning system 100. The wellbore system includes a wellbore 106 formed in a geologic formation 104. While the illustrated implementation includes a vertical wellbore 106, horizontal and deviated wellbores can also be used with aspects of this disclosure. A workstring 108 is positioned in the wellbore 106 for cleaning operations. A jetting tool 110 is positioned at a downhole end of the workstring 108. The workstring 108 is configured to direct supercritical carbon dioxide towards the jetting tool 110. The jetting tool 110 is configured to direct the supercritical carbon dioxide to impact a wall of the wellbore 106.

The system 100 includes a derrick 116 that is configured to support the workstring 108. While the illustrated system 100 includes the derrick 116, other deployment mechanisms can be used, such as coiled tubing supported by a coiled tubing truck. The workstring 108 passes through a tree 118. In some implementations, a blow-out preventer can additionally be used.

The supercritical carbon dioxide is housed in a tank 124. The tank 124 is connected to a pump 134 by a first conduit 126. The pump 134 is configured to move the supercritical carbon dioxide 114 while keeping it in a supercritical state. The pump 134 discharge is fluidically connected to the workstring 108 by a second conduit 150. The conduits can include piping, tubing, hoses, or any other suitable conduit for flowing supercritical carbon dioxide.

In operation, the workstring 108 is lowered into the wellbore so that the jetting tool 110 is at a specified depth. The supercritical carbon dioxide 114 is pumped from the tank 124 by the pump 134 into the workstring 108. The supercritical carbon dioxide 114 then travels through the workstring 108 to the jetting tool 110. The jetting tool 110 sprays the supercritical carbon dioxide 114 so that it impacts the wall of the wellbore 106. Scale 130 formed on the wall of the wellbore is removed by the supercritical carbon dioxide 114 and is lifted through the annulus 128 of the wellbore 106. The removed scale 112 can be directed to a flowback system 102 that is fluidically connected to the annulus 128 by conduit 122. The flowback system 102 can include tanks, separators, pumps, compressors, or any other equipment required for operations. In some implementations, gel sweeps can be used to at least partially lift the removed scale 112 from the wellbore 106. In some implementations, to aid in the lifting process, the operations can be performed in an underbalanced condition. That is, reservoir fluid is flowing from the formation 104 and through the wellbore annulus 128 in an uphole direction.

In some instances, the scale 130 can be an acid-soluble scale, a water-soluble scale, or an insoluble scale. While the supercritical carbon dioxide is described, in the context of this disclosure, as removing scale, supercritical carbon dioxide can be used to reduce other skinning effects, such as fines.

Figure 2:
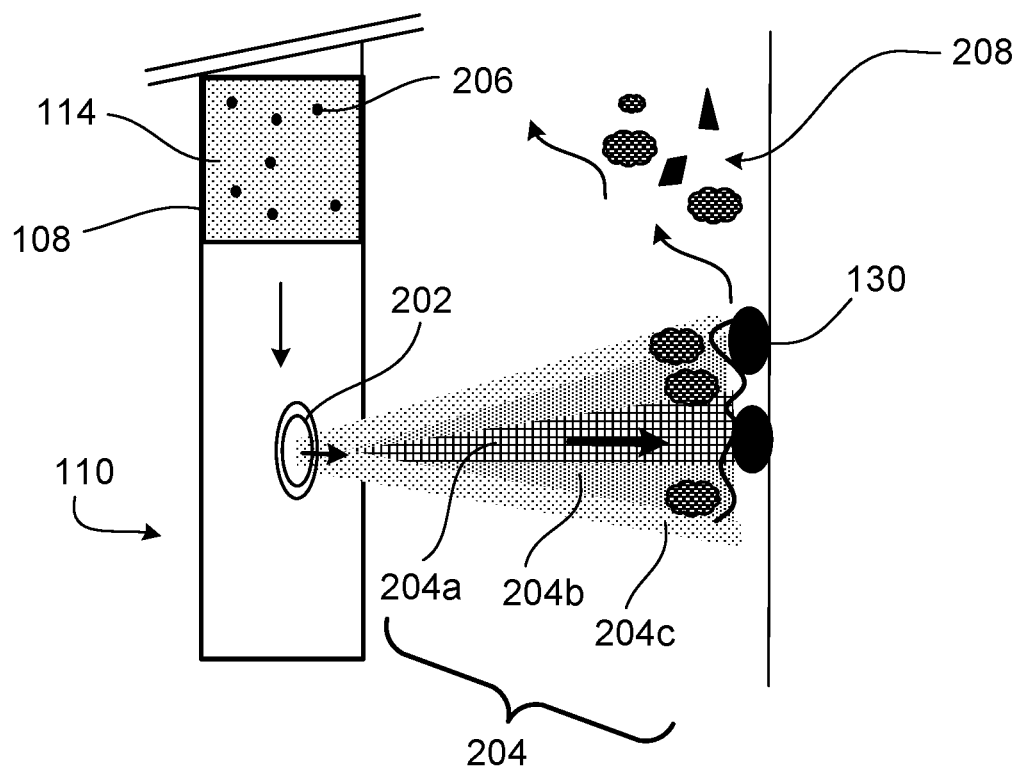
FIG. 2 is a schematic diagram of an example wellbore being cleaned with supercritical carbon dioxide.

FIG. 2 is a side view of an example jetting tool 110 ejecting supercritical carbon dioxide towards the wall of the wellbore 106. The jetting tool 110 directs the supercritical carbon dioxide to impact the wall of the wellbore with a nozzle 202. In some implementations, the nozzle 202 can be an isentropic nozzle. As the supercritical carbon dioxide 114 exits the nozzle, the supercritical carbon dioxide can transition to a solid state 204a, a liquid state 204b, a gaseous state 204c, or any combination. The solid carbon dioxide particles 204a act as an abrasive as the carbon dioxide 204 impacts the wall of the wellbore 106. The solid state 204a and liquid carbon dioxide 204b convert to a gaseous state 204c after impact. The gas expansion can at least partially help lift the removed scale particles 208 to the topside facility. The velocity and multiphase nature of the carbon dioxide as it impacts the wellbore removes the scale from the wellbore. The scale can be water-soluble scale, acid soluble scale, or non-soluble scale. In some implementations, descaling operations can be done in an underbalanced condition. In such an instance, fluids flowing from the reservoir and uphole through the annulus can help lift the removed scale particles 208 to a topside facility. Performing operations in an underbalanced condition also reduces the likelihood of formation damage. In some implementations, solid carbon dioxide crystals 206 can be pumped downhole with the supercritical carbon dioxide.

Figure 3:
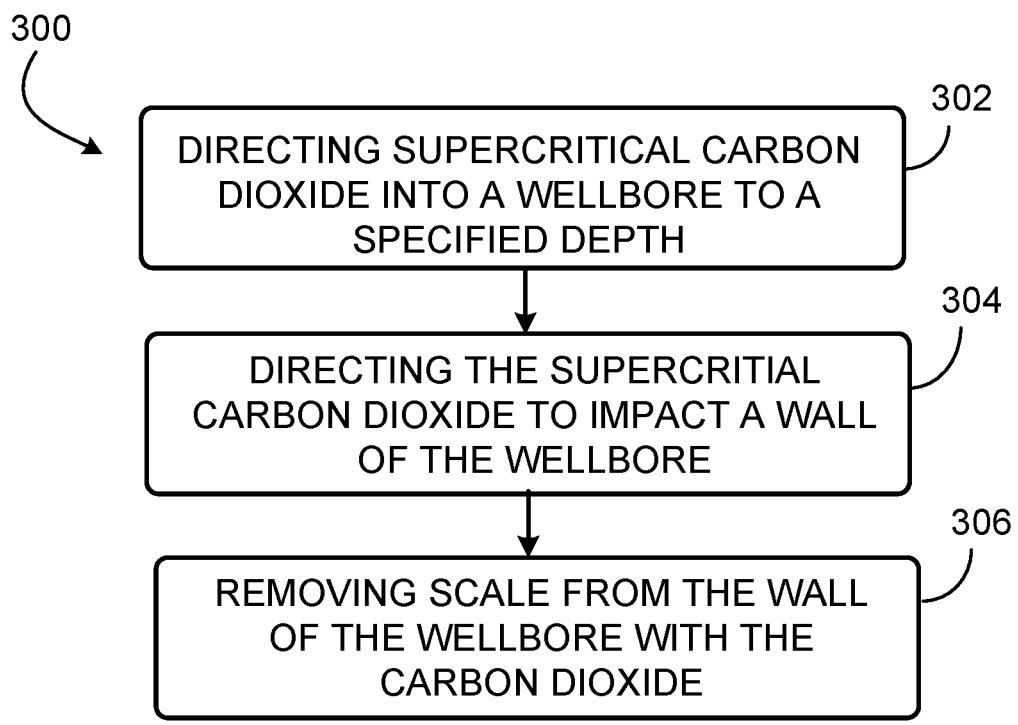
FIG. 3 is a flowchart of an example method that can be used with aspects of this disclosure.

FIG. 3 is a flowchart of an example method 300 that can be used with aspects of this disclosure. At 302, supercritical carbon dioxide is directed into a wellbore to a specified depth. At 304, the supercritical carbon dioxide is directed at an inner surface of the wellbore at the specified depth. At 306, scale is removed from the wall of the wellbore with the supercritical carbon dioxide.

While this disclosure contains many specific implementation details, these should not be construed as limitations on the scope of what may be claimed, but rather as descriptions of features specific to particular implementations. Certain features that are described in this disclosure in the context of separate implementations can also be implemented in combination in a single implementation. Conversely, various features that are described in the context of a single implementation can also be implemented in multiple implementations separately or in any suitable subcombination. Moreover, although features have been described as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the implementations previously described should not be understood as requiring such separation in all implementations, and it should be understood that the described program components and systems can generally be integrated together in a single product or packaged into multiple products.

Thus, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results.

What is claimed is:

1. A method comprising:
   directing supercritical carbon dioxide into a wellbore to a specified depth;
   directing the supercritical carbon dioxide at an inner surface of the wellbore at the specified depth; and
   removing scale from a wall of the wellbore with the supercritical carbon dioxide, wherein the supercritical carbon dioxide changes phase to a solid phase, a liquid phase, and a gas phase of carbon dioxide.

2. The method of claim 1, wherein directing the supercritical carbon dioxide onto the wall of the wellbore comprises directing through a nozzle.

3. The method of claim 2, wherein the nozzle is an isentropic nozzle.

4. The method of claim 1, further comprising extracting the removed scale from the wellbore.

5. The method of claim 1, wherein the scale is an acid-soluble scale.

6. The method of claim 1, further comprising sweeping the wellbore with a gel after extracting the removed scale.

7. The method of claim 1, further comprising flowing reservoir fluid through the wellbore in an underbalanced condition.

8. The method of claim 1, wherein the solid phase and liquid phase of carbon dioxide change to a gaseous phase after impacting the wall of the wellbore.

* * * * *